May 22, 1923.

A. E. STEPHENSON

TUBE AND TIRE REPAIR MATERIAL

Filed Oct. 21, 1922

1,456,078

INVENTOR

Patented May 22, 1923.

1,456,078

UNITED STATES PATENT OFFICE.

ALBERT E. STEPHENSON, OF DALLAS, TEXAS.

TUBE AND TIRE REPAIR MATERIAL.

Application filed October 21, 1922. Serial No. 595,973.

*To all whom it may concern:*

Be it known that I, ALBERT E. STEPHENSON, a citizen of the United States, residing at Dallas, in the county of Dallas and State of Texas, have invented a new and useful Tube and Tire Repair Material, of which the following is a specification.

This invention relates to new and useful improvements in tire patches.

The object of the invention is to provide a patch formed of alternate layers of fabric and rubber, rubber compound or the like and having one of its outer surfaces coated with a rubber adhesive and the other formed in a particular manner.

A further object of the invention is to form the outer surface or top of the patch, which contacts with the inner side of the casing, with alternate raised and depressed surfaces or corrugations, whereby air entrapped between the outer surface of the patch and the casing may escape when the tire is subjected to external pressure.

An advantage of such a patch is that it will withstand the destructive force due to rotation of the tire.

A construction designed to carry out the invention will be hereinafter described together with other features of the invention.

The invention will be more readily understood from a reading of the following specification and by reference to the accompanying drawings, in which an example of the invention is shown, and wherein—

Figure 1:
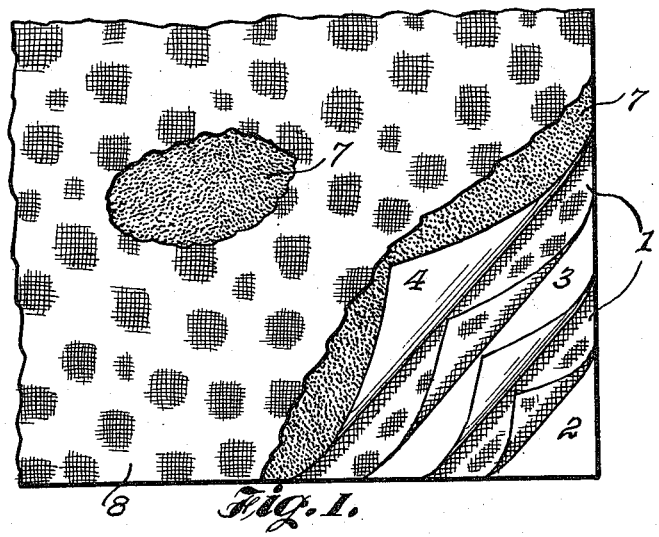
Figure 2:
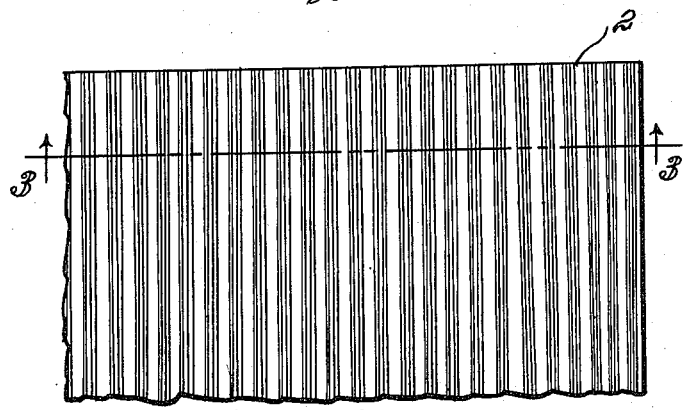
Figure 3:

Fig. 1 is an underside view of a patch constructed in accordance with my invention, the various layers of the patch being separated at one corner, Fig. 2 is a plan view of the patch, and Fig. 3 is a cross section on the line 3 3, Fig. 2.

Similar numerals refer to similar parts throughout the several views.

Two or more sheets of textile material 1, are placed between layers of raw rubber compound 2, 3, 4, forming a pile; this pile is then placed in a vulcanizing machine equipped with a mold, wherein the pile is simultaneously vulcanized and molded with alternating raised surfaces 5, and depressed surfaces 6, on the outer side of 2. To the outer side 4, is then placed a layer of standard formula quick-cure gum containing adhesive 7, which is protected against deterioration with holland cloth 8, or other suitable material until ready to be used.

I use two sheets of textile material 1, in the above pile, although it is essential that three or more be used when making a pile designed for heavier duty, such as is demanded by tires larger than those for which two sheets are ample. A patch having only one sheet or layer 1 may be used.

The alternating raised surfaces 5, and depressed surfaces 6, may be composed of various designs, but it is here intended that they should always be of such design so that any accumulation of air in the depressed surfaces 6, will at all times find a free outlet, or exit, when pressure is applied over all the surface, or at any point over the surface. By reason of the raised and depressed surfaces or corrugations air cannot be collected between the outer surface of the patch and the casing. Further excessive heating will be eliminated and the roughened surface of the patch will prevent a flat contact with the casing.

In am aware that prior to my invention of an improved tube and tire repair material there existed a number of types of tube and tire repair material, all of which, according to my observations, possessed certain faults which I claim to have overcome with my invention.

I claim:

1. A tire patch including alternately superposed layers of rubber and fabric, the outer layer being formed of rubber, the upper layer being formed with alternately raised and depressed surfaces, the bottom layer having applied thereto a layer of quick-cure gum containing an adhesive, and a protecting layer of fabric covering said adhesive layers.

2. A tire patch including alternately superimposed layers of rubber and fabric, the top layer being of rubber and having a surface formed with raised and depressed portions for preventing a flat contact with a casing, and a layer of rubber adhesive applied to the patch.

A. E. STEPHENSON.